United States Patent [19]

Dupillier

[11] Patent Number: 5,005,199
[45] Date of Patent: Apr. 2, 1991

[54] TELEPHONE INTERFACE CIRCUIT

[75] Inventor: Christian Dupillier, Brignoud, France

[73] Assignee: Dolphin Integration, Meylan, France

[21] Appl. No.: 436,588

[22] Filed: Nov. 15, 1989

[51] Int. Cl.⁵ .............................................. H04M 1/00
[52] U.S. Cl. ..................................... 379/375; 379/373
[58] Field of Search ................. 379/92, 105, 106, 107, 379/373, 374, 375, 199

[56] References Cited

U.S. PATENT DOCUMENTS

| | | | |
|---|---|---|---|
| 4,266,098 | 5/1981 | Novak | 379/142 |
| 4,409,439 | 10/1983 | Gamble | 379/375 |
| 4,459,435 | 7/1984 | Foldvary et al. | |
| 4,639,552 | 1/1987 | Hall | 379/373 |

FOREIGN PATENT DOCUMENTS

86/07222 5/1985 PCT Int'l Appl.
2097233A 12/1981 United Kingdom.

*Primary Examiner*—Jin F. Ng
*Assistant Examiner*—Jhancy Augustus
*Attorney, Agent, or Firm*—Lowe, Price, Leblanc, Becker & Shur

[57] ABSTRACT

A line powered telephone interface circuit answers an incoming call and, responsive to a command tone, routes the call to a selected terminal. If no command tone is received within a predetermined time period, low voltage audio signalling devices located near the conventional telephone sets are activated to alert the subscriber of an incoming call. The interface need not be connected to a separated supply source. The device is connected to a telephone line and to at least one plug connectable with a telephone set jack, the device being connected to various terminals. A detector detects the ring signal and a relay establishes connection with a telephone line as soon as the ring signal has been detected for a determined time duration. A combination timer/switcher circuit inhibits the ringing of the corresponding telephone set, and is associated with a sound transducer connected operable by a low voltage signal.

18 Claims, 2 Drawing Sheets

TELEPHONE INTERFACE CIRCUIT

BACKGROUND OF THE INVENTION

The invention relates to a telephone interface circuit having a responding function and liable to operate steering towards various terminals, one at least of said terminals being a telephone set.

More specifically, the invention relates to such a line powered telephone interface circuit operating without an external supply source (mains or battery) but which receives all necessary electrical supply from the telephone line within the limits allowed by the telephone networks.

Telephone interface systems are known wherein a responding type apparatus, establishes a connection with the telephone line, which is equivalent to a telephone set going off the hook. A multi-frequency decoder identifies an additional dialling signal re-emitted on the line and consequently connects the telephone line to a desired terminal.

Generally, such systems couple to remote control apparatuses, memories associated with counters or microprocressors to a transmit data over a telephone line, so that the systems operate independently of the telephone sets on specific telephone lines.

However, in some cases, it is desired to selectively implement a connection either towards a specific terminal or towards a telephone set.

In such a case, a problem is that the common type telephone sets comprises an internal ring which configured for ringing in response to a ring signal transmitted by the telephone line. The connection with the line being automatic, if one wants to operate the telephone ring, once the line has been connected, it is necessary to generate a ring signal within the interface circuit to operate the telephone ringer. Typically, ring signal is ±48 volts. The generation of such a signal makes necessary to associate the interface circuit with an electrical supply source, for example commerical A.C. power or a battery.

According to the present invention, it is desired to provide an apparatus which is powered by the telephone line and does not require external power. Thus, even if power is not available at specific subscriber location, it is possible to have a remote survey of meters, such as the electricity meter, the gas meter, the water meter, etc.

SUMMARY OF THE INVENTION

For attaining this object, the invention provides for a telephone interface circuit, which is not connected to a supply source, but is instead installed on a telephone line connected to at least one plug connectable to a telephone set jack, this circuit being connected to various terminals, and comprising first means for detecting the ring signal, second means for establishing a connection with the line as soon as the ring signal has been detected for a determined time duration, and third timing, select and steering means; each plug is directly connected with the line, arranged for inhibiting the ringing of the corresponding telephone set, and associated with a sound transducer connected with said third means and operable by a low voltage signal.

Accordingly, according to a main aspect of the invention, it is possible to avoid any electrical supply in the apparatus, due to the fact that the inventors have discovered that it was very simple to inhibit the ring of a conventional telephone set by modifying the connection of its connecting jack and to provide for independent rings (sound transducers) operating at a low voltage and a low power, presently commercially available, while according to a general preconception in the art, those skilled in the art tried to operate the internal ring of a telephone set without being aware that it was more expensive and more difficult to regenerate a ring signal than to provide for an additional sound transducer operating without an external supply source.

BRIEF DESCRIPTION OF THE DRAWINGS

Those and other objects, features and advantages of the invention will be explained with more detail in the following description of the invention made in connection with the attached drawings wherein.

DETAILED DISCLOSURE OF THE INVENTION

Figure 1:
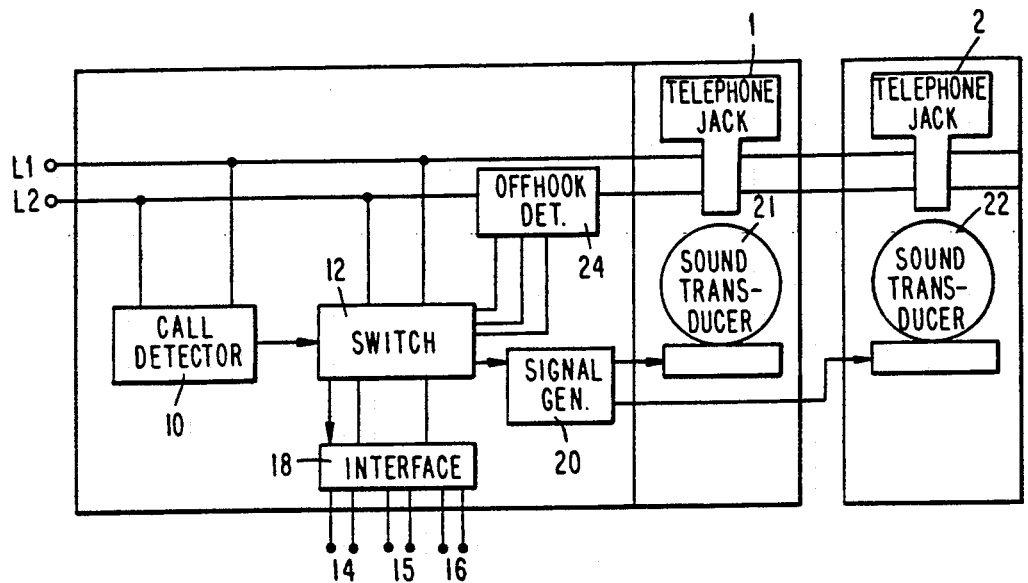
FIG. 1 is a block diagram of the general architecture of an interface circuit according to the invention.

FIG. 1 shows the general architecture of a telephone interface circuit according to the invention. This circuit is connected to the wires L1 and L2 of a telephone line which is also connected to telephone plugs 1 and 2. Two telephone plugs have been shown in FIG. 1 but it will be understood that any number of telephone plugs may be provided.

In parallel with the telephone line is connected a line connection block 10, such as conventionally existing in a responder, for operating a line connection relay some time after a ring signal appears on lines L1, L2. The minimum value of this delay time is generally dependent upon the telephone network standards.

The ring signal detection circuit 10 operates a detection, selection and steering circuit 12. Circuit 12 selectively connects the telephone line to terminals connected to points 14, 15, 16 . . . through an interface circuit 18. Additionally, the circuit 12 controls a low frequency generator 20 which sends signals to sound transducers 21 and 22, respectively arranged close to the telephone plugs 1 and 2. Sound transducers operative at a low voltage and at a low power are commercially available, for example the electromechanic transducer QMB-111 from STAR Corp. or the piezoceramic buzzer EB 20E-35C from FUJI Corp.

According to an embodiment of the invention, the electronic circuits 10–20, the plug 1 and the sound transducer 21 are arranged in the same case. The plug 2 and the sound transducer 22 are arranged in another case which will generally be remote from the first one, for example in a different room of a home or an office.

As it will be shown in greater detail hereinafter in connection with FIGS. 5 and 7, the telephone plugs 1 and 2 are wired to disable the rings of the telephone sets connected to those plugs.

Additionally, an unhooking detection circuit 24 is serially connected on the conductor L2 of the line. This circuit detects a current flow and provides suitable control signals to the circuit 12, for example for interrupting the ring of the sound transducers after a telephone is picked-up, i.e., goes off-hook.

The circuit according to the invention, as shown in FIG. 1, operates in the following way. A call signal appearing on the line L1, L2, is rapidly detected by the circuit 10 and the circuit 12 is operated.

If the calling party does not generate a command signal during a determined period of time, the circuit 12 automatically initiates operation of circuit 20 for actuating, for example, the sound transducer 21 and/or the sound transducer 22. Thus, the telephone set connected to the related plug operates conventionally, with the only difference for the calling party that he will have to wait a longer time before the telephone rings and is answere the first ring signals emitted on the line do not cause any audible signal on the called side.

In contrast, if, within the above-mentioned determined period of time, the calling party supplies on the line, with an electronic telephone set of the multifrequency transmitting type, an additional dialling number, detection of the signal will cause the circuit 12 to direct the communication to one of the terminal pairs 14, 15, 16 . . . or to send a signal to the one or the other of the sound transducers 21 or 22. This permits selection of a determined telephone set within a home at the exception of all the other telephone sets. This corresponds to a mini private branch exchange. This also permits selective actuation of a terminal or a memory associated with a counter connected to one of the terminal pairs 14, 15, 16 . . .

Figure 2:
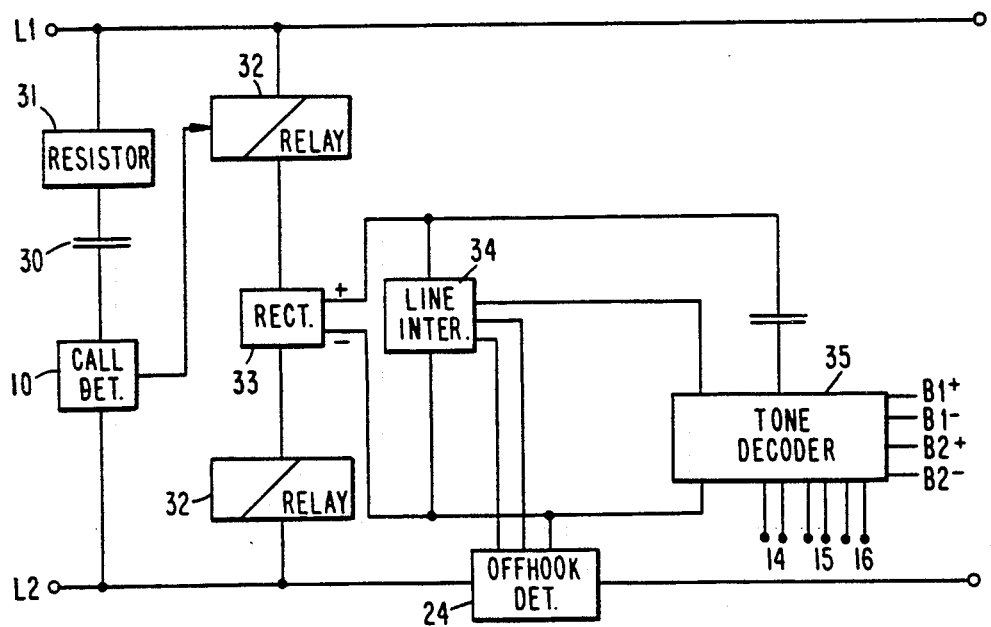
FIG. 2 is a block diagram of a portion of the circuit of FIG. 1.

FIG. 2 is a more detailed diagram of the circuit of FIG. 1. The call detection circuit 10 is connected between the lines L1 and L2, in series with a capacitor 30 and a resistor 31. It can be for example an integrated circuit such as the circuit TCM 1520A from Texas Instrument Corporation. The ring signal detector 10 triggers a relay pair 32 serially connected with a full wave rectifier 33 between lines L1 and L2. This rectifier 33 provides, from the line voltage, all the power necessary to the operation of the apparatus according to the invention. More specifically, this apparatus can comprise a line interface circuit 34 such as the circuit TCA3383 from Motorola Corp. and a multi-frequency decoder 35 such as the circuit 20C89 from SSI Corp.

FIG. 2 also shows at the output of circuit 35. Lines 14, 15, 16 . . . shown at the output of circuit 18 of FIG. 1 and lines B1+, B1− and B2+, B2− corresponding to the conductors are arranged between the circuit 20 and loudspeakers 21 and 22 of FIG. 1.

Figure 3:
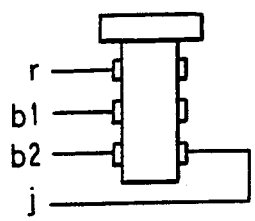
FIG. 3 shows the conventional connection of a telephone jack.

According to an aspect of the invention, conventional telephone sets are used without any connection change. In particular, in accordance with French Telecommunication Standards, the telephone sets are connected by a telephone jack as shown in FIG. 3. This jack comprises six terminals shown by vertical rectangles. Four of them are connected. Conventionally, the wire labelled r is red and corresponds to a first ring wire, the wire labelled b1 is white and corresponds to a first line wire, the wire labelled b2 is blue and corresponds to a second line wire and the wire labelled j is yellow and corresponds to a second ring wire. The wiring of those wires r, b1, b2 and j inside the telephone set are shown in the usual telephone data sheets.

Figure 4:
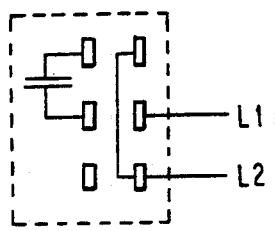
FIGS. 4 and 5 show the connecting mode of a telephone plug, conventionally and according to the invention, respectively.

Normally, the telephone jack to be inserted into a conventional telephone plug also comprising six terminals shown by vertical rectangles and the wiring of which is shown in FIG. 4 wherein references L1 and L2 correspond to the wires connected to the line conductors.

Figure 6:
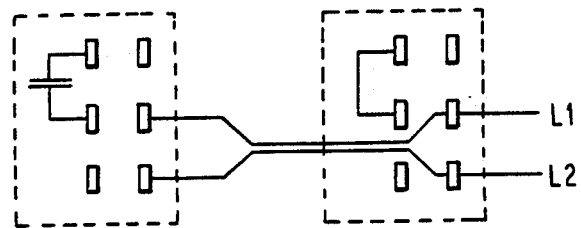
FIGS. 6 and 7 show parallel connections of telephone plugs, conventionally and according to the invention, respectively.

FIG. 6 shows the conventional way of associating in parallel two conventional telephone plugs so that the two telephone sets connected thereto operate simultaneously. It will be noted that the line wires going from one plug to the other one can be crossed.

Figure 5:
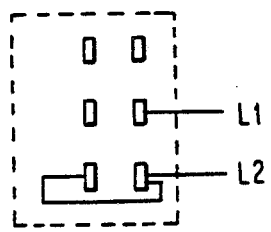
Figure 7:
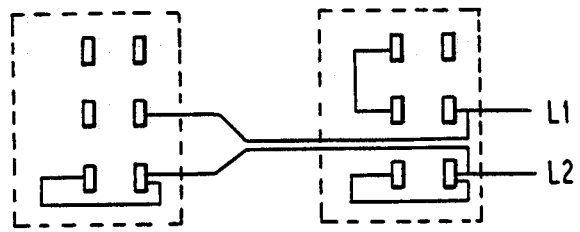

According to the invention, no modification is introduced to the telephone jack but the internal wiring of the telephone plugs are modified in the way shown in FIG. 5 in case of a single plug and in FIG. 7 in case of two parallel plugs. The connection between the lower terminals of the plugs inhibits the ring signals.

So, in the case of FIG. 1, the two plugs 1 and 2 will be wired in the way shown in FIG. 7. Although parallel connected, the two telephone sets are provided with independent call devices (the sound transducers 21 and 22).

In the above, specific features and wiring modes have been indicated in connection with the French Telephone Standards. However, it will be clear that the invention also applies to other Standards.

Of course, the invention has been only schematically disclosed and various additional circuits are possibly associated with the disclosed apparatus. For example, the unhooking detector will possibly permit to transmit a telephone call from a telephone set connected to the plug 1 or 2 without having this call impaired by the responder circuits.

I claim:

1. A line powered telephone interface circuit, comprising:
   input means for receiving an input from a telephone line (L1, L2) and providing an output to at least one telephone plug (1, 2) connectable with a telephone set jack, said interface circuit connected to various terminals;
   ring detector means (10) for detecting a ring signal on said telephone line;
   answering means (32) for establishing an off-hook connection on said telephone line in response to a ring signal being detected for a determined time duration by said ring detector means; and
   control means including timing, selecting and steering means for selectively connecting said telephone line to a selected terminal in response to a command signal received on said telephone line (12) wherein each plug includes
   connection means for directly connecting to the telephone line,
   inhibiting means for inhibiting the ringing of the corresponding telephone set, and
   connection means for connecting a sound transducer (21, 22) with said third means, said sound transducer operable by a low voltage signal.

2. A telephone interface circuit according to claim 1, wherein said control means establishes a connection to at least one sound transducer when a second determined time duration has occurred after the connection to the line.

3. A telephone interface circuit according to claim 1 wherein said third means establish a connection towards at least one sound transducer when an additional call number has been emitted on the line and has been detected by said control means.

4. A telephone interface circuit according to claim 1 wherein each sound transducer and a respective one of said plugs is arranged in a common enclosure.

5. The line powered telephone interface circuit as described in claim 1, wherein said control signal decoder comprises a multi-frequency tone decoder.

6. The line powered telephone interface circuit as described in claim 1, further comprising output means for connecting a telephone device to said telephone line and ring inhibiting means for inhibiting transmission of said ring signal to said telephone device.

7. The line powered telephone interface circuit as described in claim 6, wherein said control signal decoder comprises a multi-frequency tone decoder.

8. The line powered telephone interface circuit as described in claim 1, further comprising:
output means for connecting a telephone device to said telephone line;
off-hook detector means for detecting an off-hook condition of said telephone device; and
aural alert inhibiting means for inhibiting operation of said aural alerting means in response to said off-hook detector means detecting said off-hook condition of said telephone device.

9. The line powered telephone interface circuit as described in claim 6, further comprising output means for connecting said telephone device to said telephone line and ring inhibiting means for inhibiting transmission of said ring signal to said telephone device.

10. The line powered telephone interface circuit as described in claim 7, wherein said control signal decoder comprises a multi-frequency tone decoder.

11. A line powered telephone interface circuit for answering an incoming telephone call on a telephone line indicated by a high voltage a.c. ring signal and routing the call to a selected terminal upon detection of a selection signal and, in the absence of said selection signal, generating an audible signal to alert a user to said incoming telephone call, said interface circuit powered exclusively by a low voltage d.c. loop current present on said telephone line, said low voltage d.c. loop current being a lower than said high voltage a.c. ring signal, said interface circuit voltage comprising:
input means for receiving signals from said telephone line;
ring detector means for detecting a ring signal on said telephone line;
line termination means for generating an off-hook condition on said telephone line responsive to detection of a ring signal by said ring detector;
control signal detector means for detecting a control signal on said telephone line;
control signal decoder means for decoding a control signal detected by said control signal detector means;
line switching means for selectively applying said telephone line to the selected terminal in response to said control signal decoder decoding said control signal;
timer means responsive to said ring detector means and to said control signal detector means for supplying an alert signal a predetermined period after an initial detection of said ring signal by said ring detector means in the absence of said control signal detector means detecting a control signal during said time period; and
aural alerting means powered by said low voltage d.c. loop current on said telephone line for generating an aural alerting signal in response to said timer means for alerting a user to an incoming telephone call.

12. A line powered telephone interface circuit for answering an incoming telephone call on a telephone line and routing the call to a selected terminal device upon detection of a selection signal and, in the absence of said selection signal, generating an audible signal to alert a user to said incoming telephone call, said interface circuit powered exclusively by a loop current present on said telephone line, said interface circuit comprising:
input means for receiving said telephone line;
a plurality of output terminals for supplying an incoming telephone call to a selected terminal device connected to a respective one of said plurality of output terminals;
ring detector means for detecting a ring signal on said telephone line;
line termination means for generating an off-hook condition on said telephone line responsive to detection of a ring signal by said ring detector;
control signal detector means for detecting a control signal on said telephone line;
control signal decoder means for decoding a control signal detected by said control signal detector means;
line switching means for selectively connecting said telephone line to a respective one of said output terminal to which said selected terminal device is connected in response to said control signal decoder decoding said control signal;
timer means responsive to said ring detector means and said control signal detector means for supplying an alert signal a predetermined period after an initial detection of said ring signal by said ring detector means in the absence of said control signal detector means detecting a control signal during said time period; and
aural alerting means powered by said loop current on said telephone line for generating an aural alerting signal in response to said timer means for alerting a user to an incoming telephone call.

13. The line powered telephone interface circuit as described in claim 10, wherein said control signal decoder comprises a multi-frequency tone decoder.

14. The line powered telephone interface circuit as described in claim 10, further comprising output means for connecting a telephone device to said telephone line and ring inhibiting means for inhibiting transmission of said ring signal to said telephone device.

15. The line powered telephone interface circuit as described in claim 14, wherein said control signal decoder comprises a multi-frequency tone decoder.

16. The line powered telephone interface circuit as described in claim 10, further comprising:
output means for connecting a telephone device to said telephone line;
off-hook detector means for detecting an off-hook condition of said telephone device; and
aural alert inhibiting means for inhibiting operation of said aural alerting means in response to said off-hook detector means detecting said off-hook condition of said telephone device.

17. The line powered telephone interface circuit as described in claim 14, further comprising output means for connecting said telephone device to said telephone line and ring inhibiting means for inhibiting transmission of said ring signal to said telephone device.

18. The line powered telephone interface circuit as described in claim 15, wherein said control signal decoder comprises a multi-frequency tone decoder.

* * * * *